(12) United States Patent
Zhou et al.

(10) Patent No.: US 11,381,043 B2
(45) Date of Patent: Jul. 5, 2022

(54) ELECTRICAL CONNECTOR WITH LED TRANSVERSELY NEIGHBORING PARTIAL LIGHT GUIDING RING

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Zhong-Hua Zhou, Kunshan (CN); Zhi-Jian Chen, Kunshan (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 106 days.

(21) Appl. No.: 16/881,652

(22) Filed: May 22, 2020

(65) Prior Publication Data
US 2020/0373714 A1    Nov. 26, 2020

(30) Foreign Application Priority Data
May 22, 2019    (CN) .......................... 201910426762.0

(51) Int. Cl.
| | | |
|---|---|---|
| *H01R 13/659* | (2011.01) | |
| *H01R 13/717* | (2006.01) | |
| *F21V 8/00* | (2006.01) | |

(52) U.S. Cl.
CPC ....... *H01R 13/7175* (2013.01); *G02B 6/0045* (2013.01); *G02B 6/0083* (2013.01); *H01R 13/659* (2013.01)

(58) Field of Classification Search
CPC .............. H01R 13/717; H01R 13/7175; H01R 13/641; H01R 12/7076; H01R 9/2408
See application file for complete search history.

(56) References Cited

U.S. PATENT DOCUMENTS

| | | | | |
|---|---|---|---|---|
| 6,971,907 B1* | 12/2005 | Stroud | ............... | H01R 13/6641 439/490 |
| 7,112,097 B1* | 9/2006 | Lam | ..................... | H01R 25/003 439/654 |
| 7,654,858 B2* | 2/2010 | Geiger | ................. | H01R 13/641 439/490 |
| 2016/0149355 A1* | 5/2016 | Yeom | ................. | H01R 13/7175 439/488 |
| 2018/0131140 A1* | 5/2018 | Du | ..................... | H01R 13/7175 |
| 2018/0320867 A1* | 11/2018 | Chang | .................. | F21V 21/088 |

FOREIGN PATENT DOCUMENTS

CN    201805065 U    4/2011

\* cited by examiner

*Primary Examiner* — Truc T Nguyen
(74) *Attorney, Agent, or Firm* — Ming Chieh Chang; Wei Te Chung (57) ABSTRACT

An electrical connector includes an insulative housing, a plurality of contacts assembled in the housing, a plurality of cylindrical mating ports located on and forwardly extending from a front face of the housing, and a plurality of LEDs (Light Emitting Diodes) disposed in the housing behind the front face thereof. The mating port includes a majority part and a minority part engaged with each other wherein the majority part has the material same with or similar to that of the housing and is spaced away from the LED while the minority part is essentially translucent or transparent for light transmission/guiding and intimately confronts the LED.

19 Claims, 9 Drawing Sheets

ELECTRICAL CONNECTOR WITH LED TRANSVERSELY NEIGHBORING PARTIAL LIGHT GUIDING RING

BACKGROUND OF THE INVENTION

1. Field of the Invention

The present invention relates generally to an electrical connector, and particularly to the electrical connector for audio transmission which is equipped with an LED associated with a partial light guiding ring partially surrounding a round mating port.

2. Description of Related Arts

China Utility Patent No. CN201805065 discloses an electrical connector for audio transmission with LEDs and the associated light guiding rings surrounding the tubular mating ports, respectively. Notably, the reason why the audio connector is required to be equipped with the LED is to allow the user to identify and locate the position of the corresponding mating port of the electrical connector in the dark. U.S. Pat. Nos. 10,236,641 and 10,236,642 disclose the light guiding ring which replaces the tubular mating port for simplifying the structures thereof. Anyhow, the material of the light guiding ring is more expensive than that of the insulative housing of the electrical connector, and is inferior thereto in the mechanical viewpoint during mating.

It is desired to have the electrical connector for audio transmission with an economic and easy manufacturing design

SUMMARY OF THE INVENTION

To achieve the above object, an electrical connector includes an insulative housing, a plurality of contacts assembled in the housing, a plurality of cylindrical mating ports located on and forwardly extending from a front face of the housing, and a plurality of LEDs (Light Emitting Diodes) disposed in the housing behind the front face thereof. The mating port includes a majority part and a minority part engaged with each other wherein the majority part has the material same with or similar to that of the housing and is spaced away from the LED while the minority part is essentially translucent or transparent for light transmission/guiding and intimately confronts the LED.

Other advantages and novel features of the invention will become more apparent from the following detailed description of the present embodiment when taken in conjunction with the accompanying drawings.

DETAILED DESCRIPTION OF THE PREFERRED EMBODIMENT

Referring to FIGS. 1-8, an electrical connector 100 includes an insulative housing 1, a plurality of contacts 2 retained in the housing 1, a plurality of cylindrical mating ports 3 located upon a front face of the housing 1, and a plurality of LEDs 4 retained in the housing 1. The mating port 3 forms a mating hole 31 and includes a first/minority part 32 and a second/majority part 33. The first part 32 is made by translucent/transparent material for light guiding while the second part 33 is made by opaque material having mechanical characteristics similar to that of the housing 1. The LED 4 is located adjacent to and intimately confronts the first part 32. Understandably, because the second part 33 is opaque to stop light transmission, the first part 32 is able to forwardly spread the light derived from the LED 4 efficiently.

The mating port 3 includes the front ring/mating portion 34 and a pair of rear upper fixing portion 35 and lower fixing portion 36 for retaining the mating port 3 to the housing 1. The LED 4 is located above and abuts against the upper fixing portion 35. The first part 32 forms a passageway 321 to receive a contacting section 21 of the contact 2, and the second part 33 forms another passageway 331 opposite to the passageway 321 to receive a contacting section 21 of another contact 2.

The retention between the first part 32 and the second part 33 can be made by assembling after molding, or single short and double shot molding.

Figure 7:
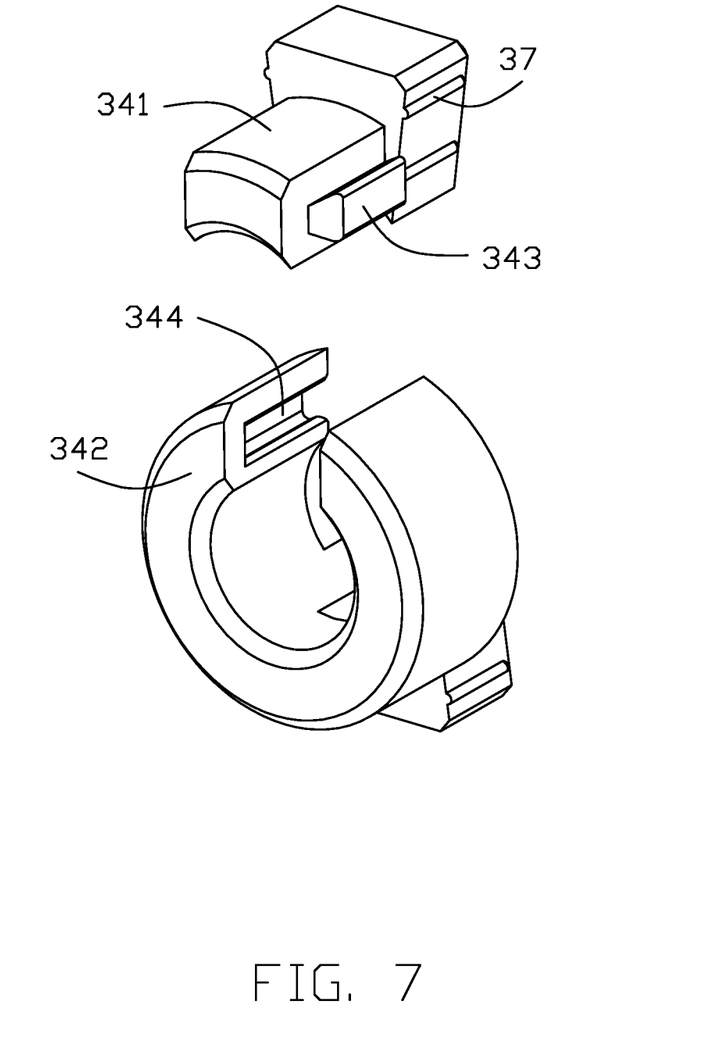
FIG. 7 is an exploded perspective view of the mating port of the electrical connector of FIG. 6.
Figure 8:
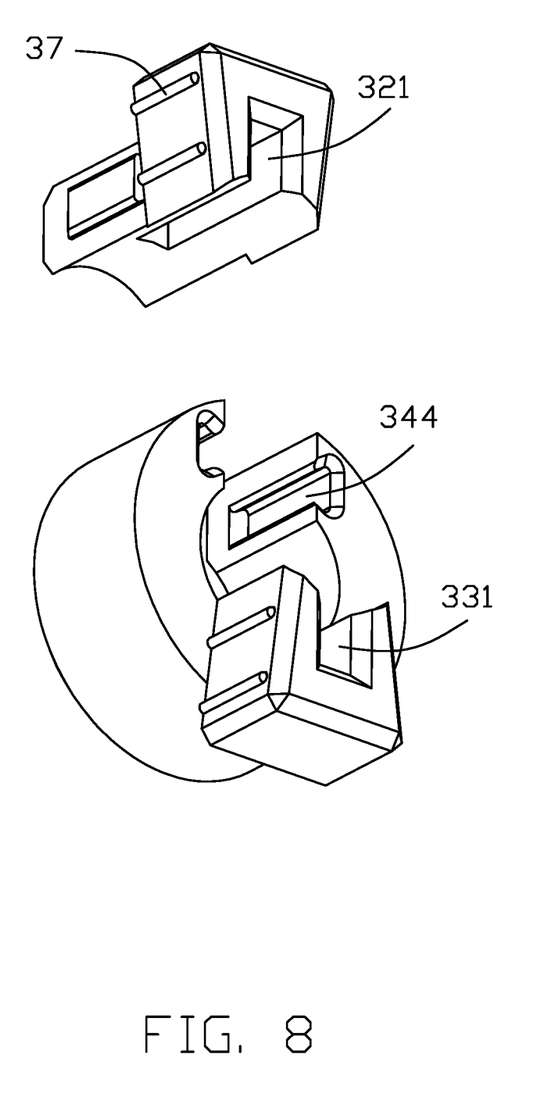
FIG. 8 is another exploded perspective view of the mating port of the electrical connector of FIG. 7.
Figure 9:
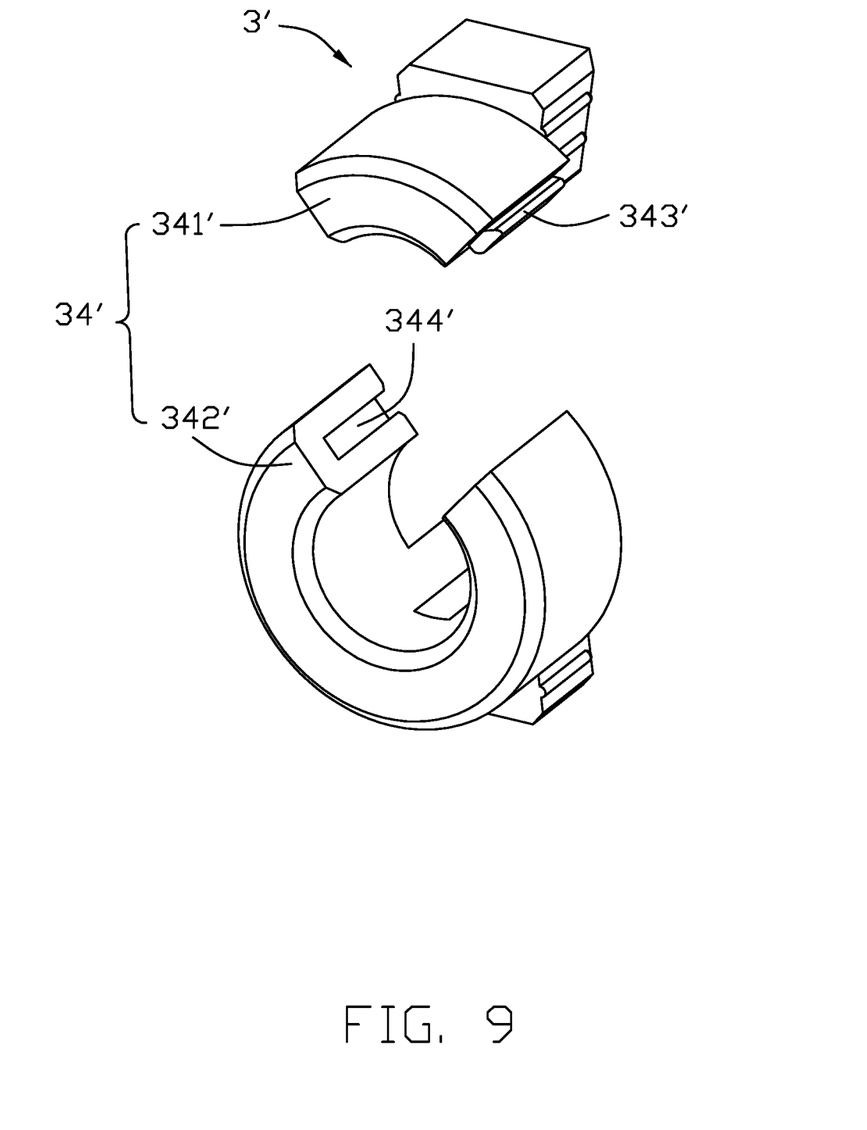
FIG. 9 is an exploded perspective view of the mating port of the electrical connector according to another embodiment of the invention.

In detail, the ring portion 34 includes a small arc section 341 and a large arc section 342 complementary with each other to form the complete ring portion 34. The first part 32 includes the small arc section 341 and the upper fixing portion 35 while the second part includes the large arc section 342 and the lower fixing portion 36. The small arc section 341 includes a pair of engagement ribs 343, and the large arc section 342 includes a pair of engagement grooves 344 receiving the pair of engagement ribs 342 for fastening the first part 32 and the second part 33 together. The upper fixing portion 35 and the lower fixing portion 36 include corresponding ribs 37, and the front face of the housing 1 forms corresponding receiving cavities 11 to receive the upper fixing portion 35 and the lower fixing portion 36 in an interference fit. Notably, two lateral side portions of the ring portion 34 rearwardly abut against the front face of the housing 1 when the upper fixing portion 35 and the lower fixing portion 36 are securely retained in the corresponding receiving cavities 11. In FIG. 9, compared with the first embodiment, the small arc section 341' is increased while the large arc section 342 is decreased so as to increase the light transmission area for enhancing light spreading.

Figure 4:
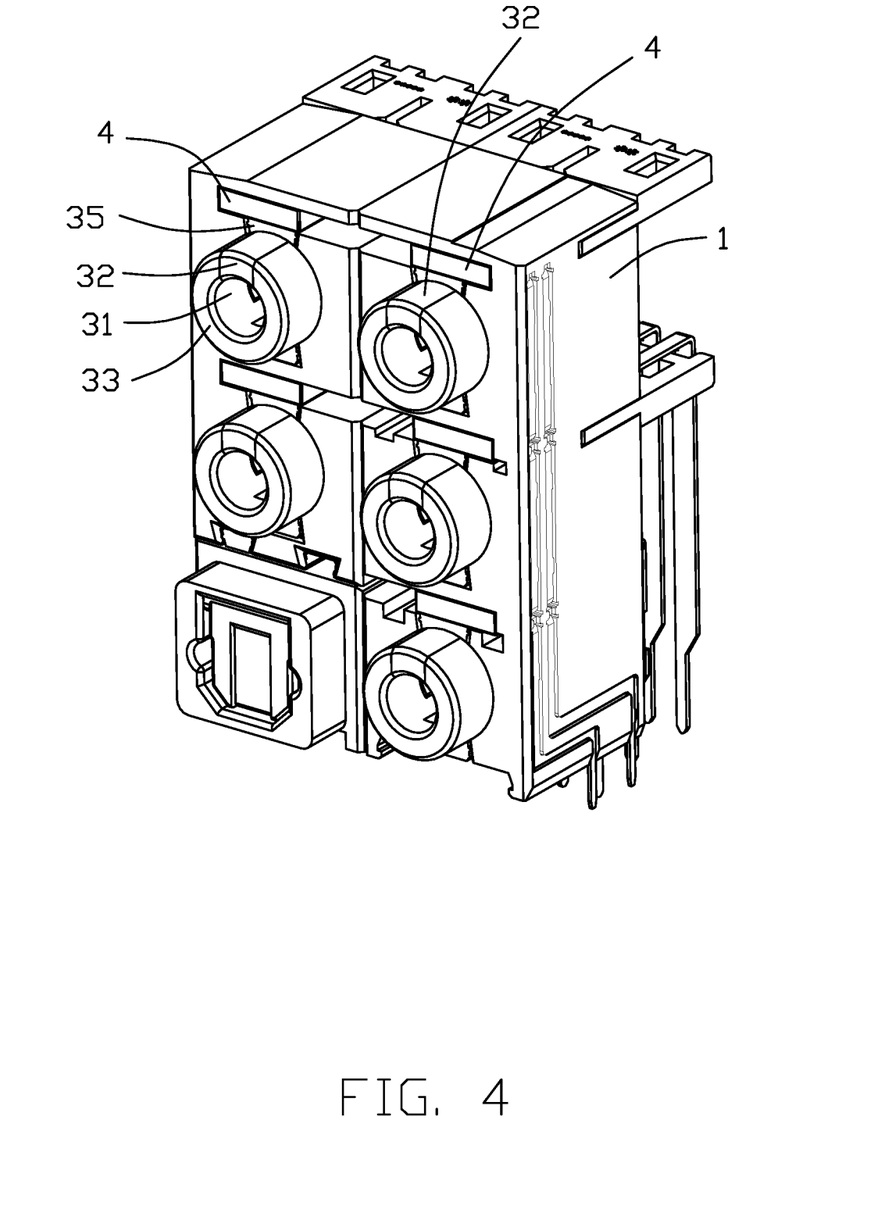
FIG. 4 is a perspective view of the primary body of the electrical connector of FIG. 3.
Figure 5:
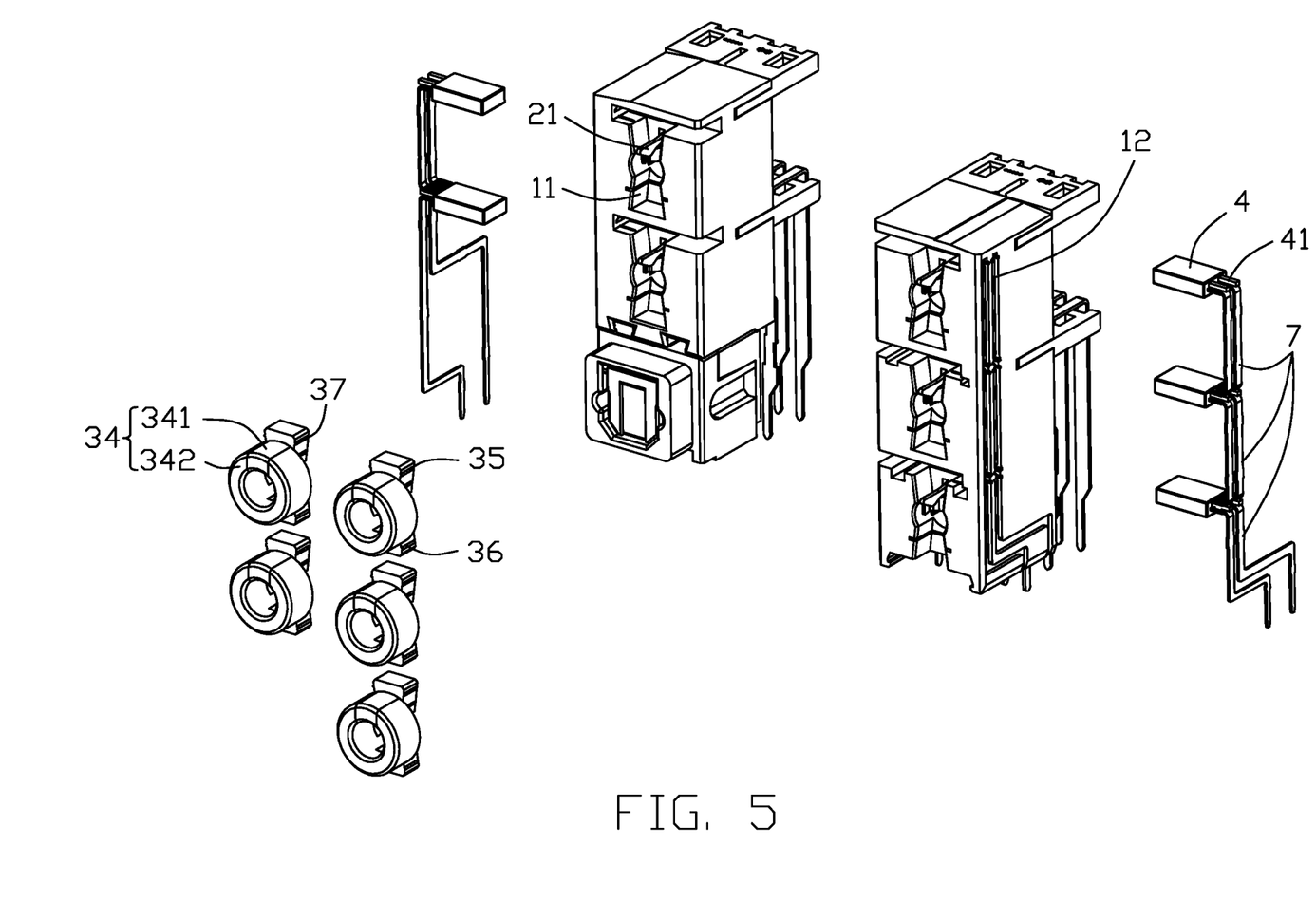
FIG. 5 is an exploded perspective view of the primary body of the electrical connector of FIG. 3.
Figure 6:
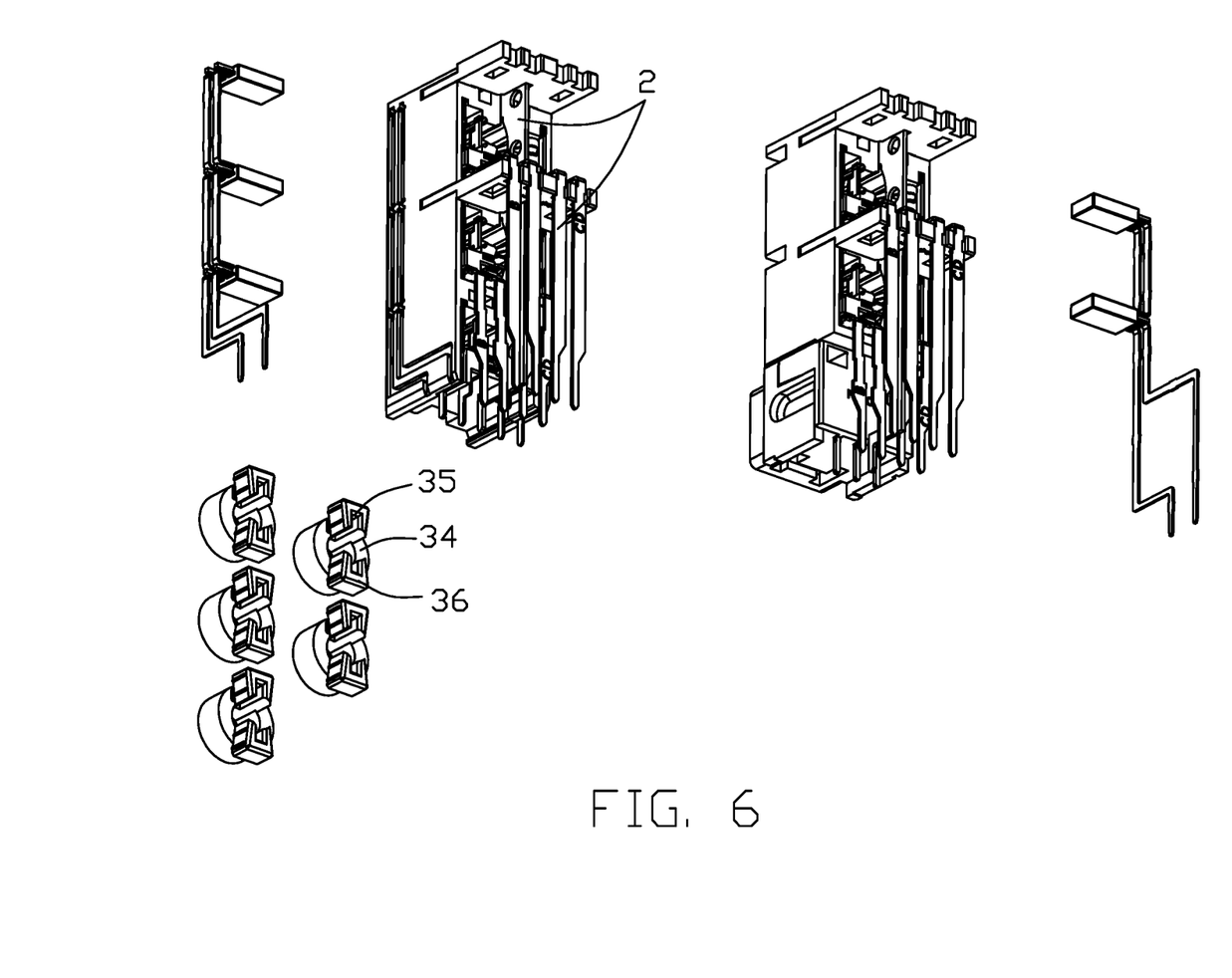
FIG. 6 is another exploded perspective view of the primary body of the electrical connector of FIG. 5.

Referring to FIGS. 4-6, the housing 12 forms a plurality of grooves 12 to receive the corresponding connecting legs 7 which extend downwardly for mounting to a printed circuit board on which the housing 1 is seated. Each LED 4 includes a pair of tails 41 mechanically and electrically connected to the connecting legs 7, respectively, so as to be electrically connected to the printed circuit board. Notably, the LED 4 is assembled into the corresponding space (not labeled) to have the tails 41 electrically and mechanically connected to the connecting legs 7.

Figure 1:
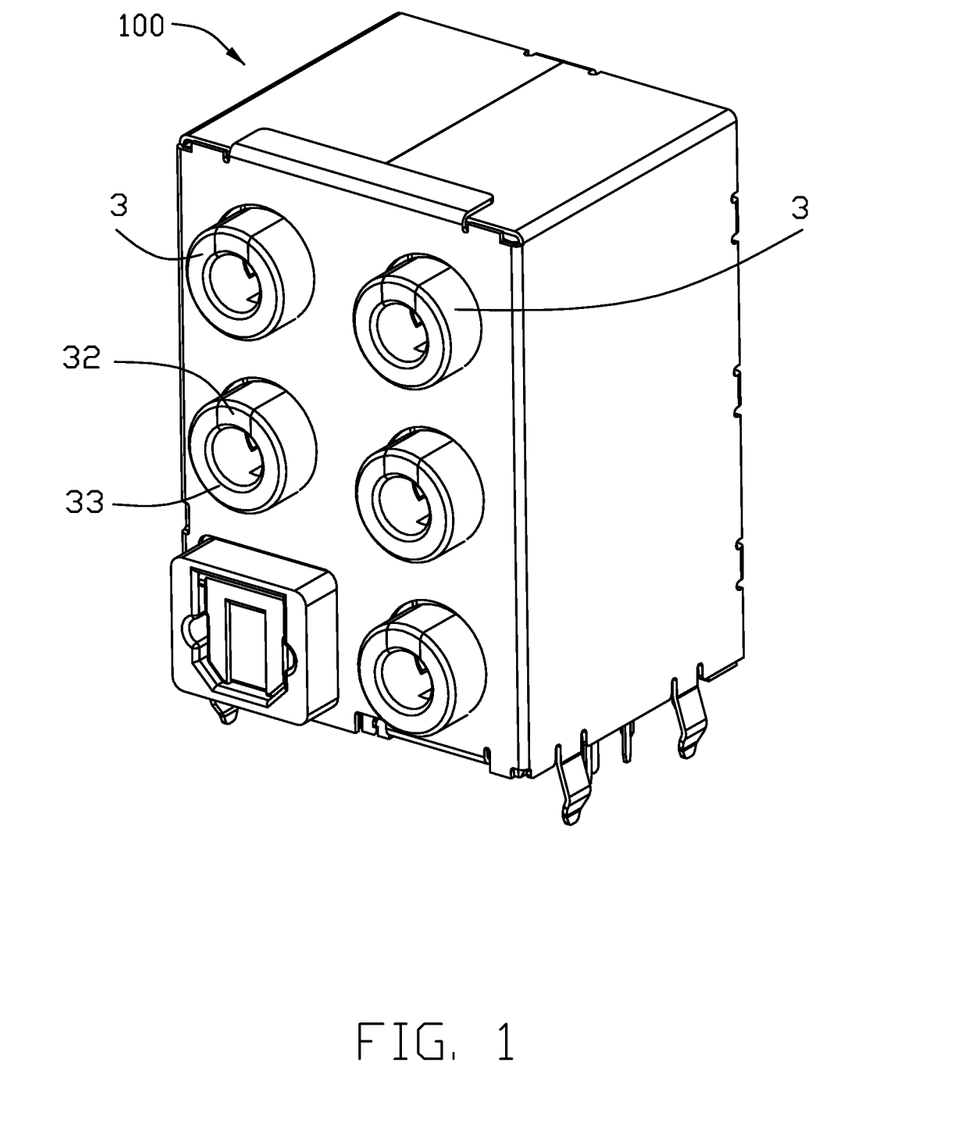
FIG. 1 is a perspective view of the electrical connector according to the present invention.
Figure 2:
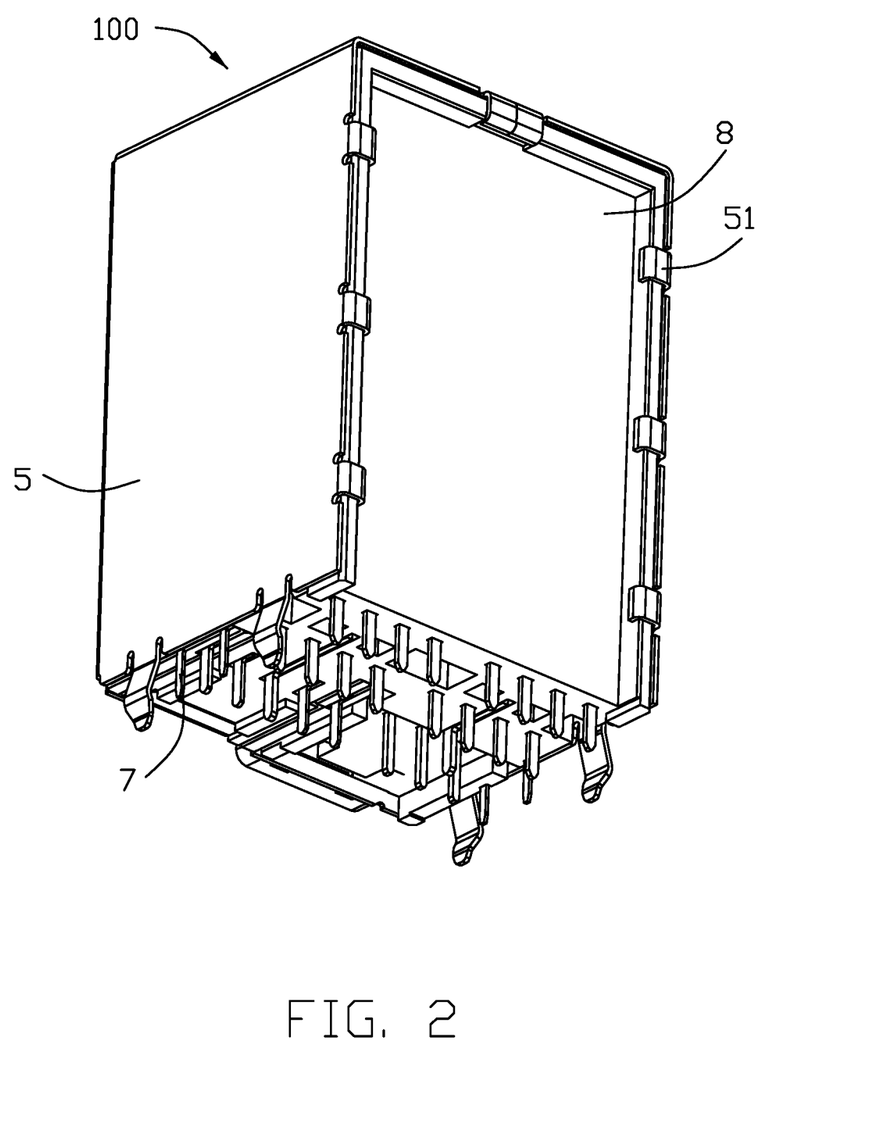
FIG. 2 is another perspective view of the electrical connector of FIG. 1.
Figure 3:
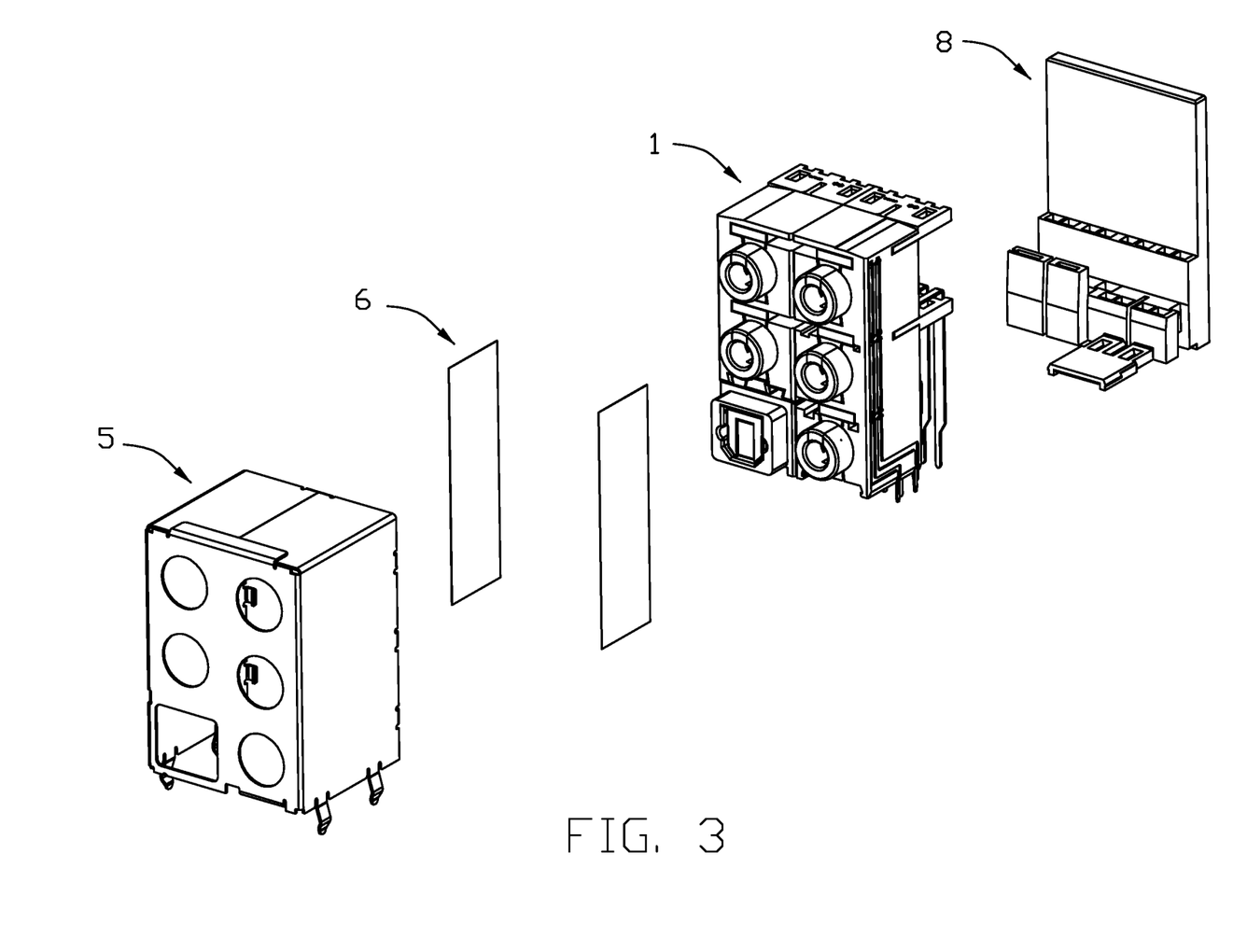
FIG. 3 is an exploded perspective view of the electrical connector of FIG. 1.

The connector 100 includes a rear plate 8 assembled upon a rear side of the housing 1, and a metallic shield 5 surrounding the housing 1. The ring portions 34 of the mating ports 3 are exposed outside of the shield 5 while the upper fixing portions 35 and the lower fixing portions of the mating ports 3 and the LEDs 4 are protectively hidden behind the shield 5. A pair of insulative plates 6 are located upon the side faces of the housing 1 to isolate the connecting legs 7 from the shield 5. Notably, the rear plate 8 forms a plurality of channels to receive the vertical legs of the contacts 2 for alignment consideration. The shield 5 forms a plurality of claws 51 to grasp the rear plate 8.

Compared with the traditional designs in which the cylindrical mating port is made circumferentially by either the opaque material or the translucent material mutually exclusive, in the instant invention the ring portion of the mating port is divided into two arc sections of which one is made by opaque material and the other by translucent material, thus resulting in the economic viewable and endurable mating port.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. An electrical connector comprising:
   an insulative housing defining a front face;
   a plurality of contacts retained in the housing;
   at least one cylindrical mating port located upon the front face and forming a front ring portion with therein a mating hole extending along a front-to-back direction; and
   an LED (Light Emitting Diode) disposed in the front face; wherein
   the ring portion is divided into first and second arc sections complementary with each other, and said first arc section is made of translucent material while said second arc section is made of opaque material, wherein said LED is located adjacent to said first arc section while being far away from said second arc section; and
   the mating port includes a pair of rear fixing portions, and one of the pair of rear fixing portions is made of translucent material and unitarily formed with the first arc section and the other of the pair of rear fixing portions is made of opaque material and unitarily formed with the second arc section.

2. The electrical connector as claimed in claim 1, wherein said first arc section is smaller than said second arc section.

3. The electrical connector as claimed in claim 1, wherein each of said rear fixing portions forms a passageway to receive a contacting section of the corresponding contact.

4. The electrical connector as claimed in claim 1, wherein the front face of the housing forms a cavity to receive the pair of rear fixing portions therein.

5. The electrical connector as claimed in claim 1, wherein the LED abuts against the rear fixing portion made of translucent material.

6. The electrical connector as claimed in claim 5, wherein said LED abuts against the rear fixing portion in a vertical direction perpendicular to the front-to-back direction.

7. The electrical connector as claimed in claim 1, further including a metallic shield enclosing the housing, wherein both the LED and the pair of rear fixing portions are protectively hidden behind the shield while the front ring portion extends forwardly beyond the shield.

8. The electrical connector as claimed in claim 7, wherein a pair of connecting legs are located on a side face of the housing, and a pair of tails of the LED extend in a transverse direction perpendicular to the front-to-back direction to mechanically and electrically connect to the pair of connecting legs.

9. The electrical connector as claimed in claim 8, wherein an insulative plate is located between said side face and the shield in the transverse direction.

10. The electrical connector as claimed in claim 1, wherein one of said first and second arc sections forms an engagement rib while the other of said first and second arc sections forms an engagement groove receiving said engagement rib therein.

11. An electrical connector comprising:
    an insulative housing defining a front face;
    a plurality of contacts retained in the housing;
    at least one cylindrical mating port located upon the front face and forming a front ring portion with therein a mating hole extending along a front-to-back direction; and
    an LED (Light Emitting Diode) disposed in the front face; wherein
    the ring portion is divided into first and second arc sections complementary with each other, said first arc section is made of translucent material while said second arc section is made of opaque material, and said LED is located adjacent to said first arc section while being far away from said second arc section; and
    one of said first and second arc sections forms an engagement rib while the other of said first and second arc sections forms an engagement groove receiving said engagement rib.

12. The electrical connector as claimed in claim 11, wherein said first arc section is smaller than said second arc section.

13. The electrical connector as claimed in claim 11, wherein each of said rear fixing portions forms a passageway to receive a contacting section of the corresponding contact.

14. The electrical connector as claimed in claim 11, wherein the front face of the housing forms a cavity to receive the pair of rear fixing portions therein.

15. The electrical connector as claimed in claim 11, wherein the LED abuts against the rear fixing portion made of translucent material.

16. The electrical connector as claimed in claim 15, wherein said LED abuts against the rear fixing portion in a vertical direction perpendicular to the front-to-back direction.

17. The electrical connector as claimed in claim 11, further including a metallic shield enclosing the housing, wherein both the LED and the pair of rear fixing portions are protectively hidden behind the shield while the front ring portion extends forwardly beyond the shield.

18. The electrical connector as claimed in claim 17, wherein a pair of connecting legs are located on a side face of the housing, and a pair of tails of the LED extend in a transverse direction perpendicular to the front-to-back direction to mechanically and electrically connect to the pair of connecting legs.

19. The electrical connector as claimed in claim 18, wherein an insulative plate is located between said side face and the shield in the transverse direction.

\* \* \* \* \*